United States Patent [19]
Jenkins

[11] Patent Number: 5,362,283
[45] Date of Patent: * Nov. 8, 1994

[54] APPARATUS AND METHOD FOR ADJUSTING THE TRACTIVE TORQUE AT THE DRIVEN WHEELS OF A SCALE MODEL VEHICLE

[75] Inventor: Jimmy R. Jenkins, Garland, Tex.

[73] Assignee: Traxxas Corporation, Dallas, Tex.

[*] Notice: The portion of the term of this patent subsequent to Apr. 14, 2009 has been disclaimed.

[21] Appl. No.: 869,086

[22] Filed: Apr. 14, 1992

Related U.S. Application Data

[63] Continuation of Ser. No. 488,971, Mar. 5, 1990, Pat. No. 5,104,361.

[51] Int. Cl.$^5$ .................... F16H 1/38; F16H 13/10
[52] U.S. Cl. .................... 475/184; 475/264; 74/650
[58] Field of Search ............ 74/650, 212, 395, 396; 475/184, 196, 220, 223, 234, 235, 243, 248, 249, 264; 446/465, 448

[56] References Cited

U.S. PATENT DOCUMENTS

| | | | |
|---|---|---|---|
| 3,130,604 | 4/1964 | Johnson et al. | 74/650 |
| 5,104,361 | 4/1992 | Jenkins | 475/184 |

Primary Examiner—Leslie A. Braun
Assistant Examiner—Khoi Ta
Attorney, Agent, or Firm—Thomas D. Copeland

[57] ABSTRACT

This invention provides and improved apparatus and an improved method of adjusting the tractive torque at the driven wheels of a scale model vehicle employing an enclosed friction driven differential. The invention's improvements allow this adjustment to be accomplished without disassembly of the driven axles, or removing any member of the differential's enclosure to gain access to the internal adjusting components.

4 Claims, 4 Drawing Sheets

APPARATUS AND METHOD FOR ADJUSTING THE TRACTIVE TORQUE AT THE DRIVEN WHEELS OF A SCALE MODEL VEHICLE

This is a continuation of U.S. application Ser. No. 07/488,971 filed Mar. 5, 1990, now U.S. Pat. No. 5,104,361.

BACKGROUND OF THE INVENTION

1. Field of Use

This invention will be used in the scale model vehicle industry, and more particularly to remote controlled racing vehicles where there is the requirement for regular adjustment of its differential's output torque. The need for a simple, rapid, and reliable means for making the adjustment has existed for sometime in this industry. Prior attempts have as yet failed to meet this need. Most have required dismantling of one drive line or the differential enclosure. The instant invention not only meets this need, it provides an economy of vehicle operation by eliminating cost of replacing damaged drive lines incurred when removing them to make an adjustment.

2. Prior Art

Known prior art in this industry is illustrated in FIGS. 4 and 5 of the drawings. The prior art does not reveal the specific apparatus and method of the instant invention, and such prior devices require disassembly of driven shafts or the removal of enclosures to make the required adjustments.

SUMMARY OF THE INVENTION

A principal object of this invention is to provide an apparatus for adjusting the tractive torque at the driven wheels of a remote controlled scale model vehicle without requiring disassembly of a driven axle, or any dismantling of the enclosure that houses the friction driving differential.

Another object is to provide a locking apparatus, such as a locking pin, that prevents rotation of at least one driven wheel but permits rotation of the opposite driven wheel.

Still another object presents a guidance means, installed into the differential's enclosure, which provides directional control of a locking apparatus within the differential's enclosure.

An additional object is to supply an apparatus for varying the compressive force applied by the differential's opposed friction drive plates to the adjacent friction members encased within the configured plastic web of the drive gear.

DESCRIPTION OF THE PREFERRED EMBODIMENT

Figure 1:
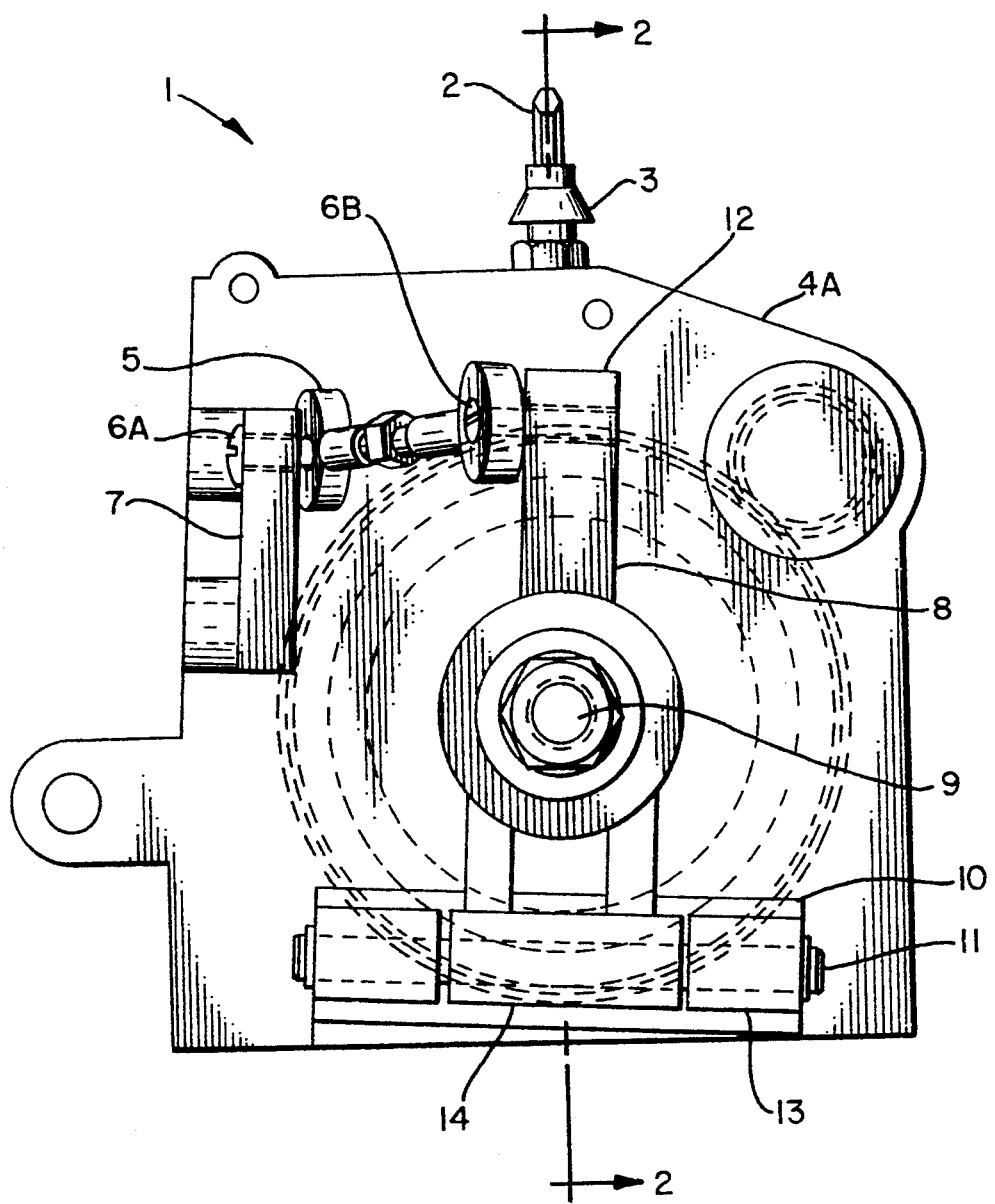
FIG. 1 is outside side view of the differential taken from one axial end.

In FIG. 1 the instant invention 1, an improved differential is shown. Locking pin 2, which may be a small hexagon wrench made with a sufficiently long shank and a shorter, insertion limiting shank 2A perpendicular to the long shank, is inserted into the differential through guide means adapter 3. Guide means adapter 3 is securely assembled to the plastic differential housing half 4A such that the locking pin 2 may clearly pass through the internal members of the differential as better seen in FIGS. 2 and 3. Locking pin 2 prevents a first driven spindle 9 from rotation. FIG. 1 further illustrates the relationship of the basic external support members of the power transmission line to a first driven spring 9 supported by bearings within spindle housing 8. Spindle housing 8 is pivotally attached to stationary flange 7 with line 5. Link 5 is fastened to stationary flange 7, and the upper knuckle 12 of spindle housing 8 with pivot pins 6A and 6B, providing lateral stability for the driven spindle 9 as spindle housing 8 pivots about pivot pin 11. Spindle housing 8 is attached to A-frame 10 with pivot pin 11 which passes through the fixed outside trunnions 13 on A-frame 10 and the fixed inside lower knuckle 14 on spindle housing 8, all as shown in FIG. 1.

Figure 2:
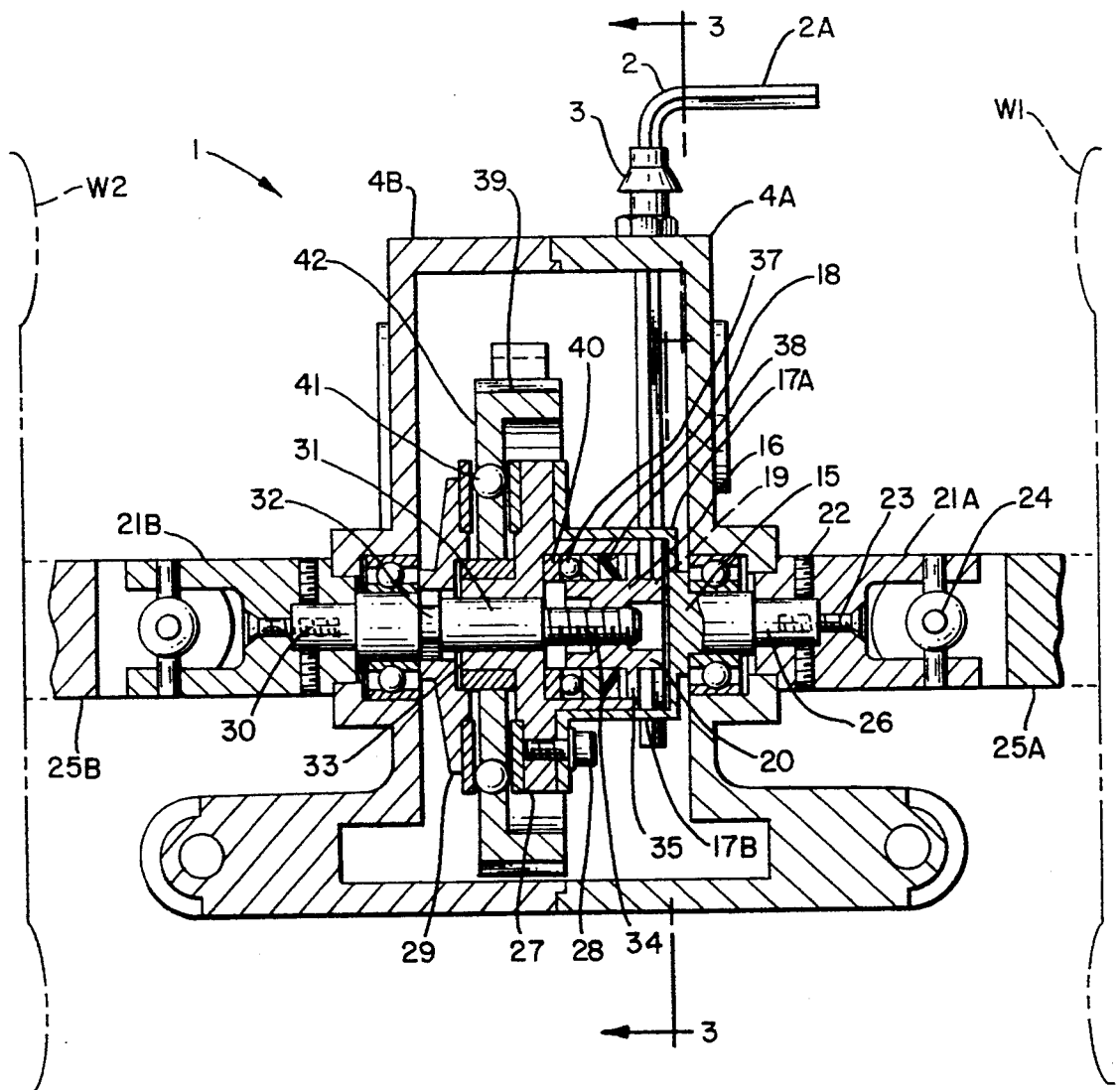
FIG. 2 is a section view of the differential taken along line 2—2 of FIG. 1.
Figure 2A:
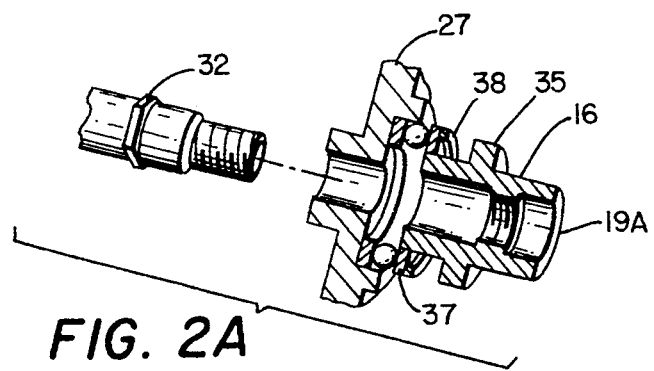
FIG. 2A is a partial pictorial view to clarify certain component relationships shown in FIG. 2.

The improved apparatus for adjusting the torque at the driven wheels W1 and W2 is best seen in FIGS. 2 and 2A. Locking pin 2 is shown passing through guide means adapter 3; through a second guide means comprising coincident transverse holes 17A and 17B provided in the circular housing 18 which is an integral part of first stub axle 15; and is positioned adjacent either one of the flat parallel surfaces 19A or 19B of shank 20 of locking adjusting nut 16, thereby preventing rotation of the first stub axle 15, and locking adjusting nut 16. Further shown in FIG. 2, universal yoke 21A is secured to a first stub axle 15 using a flat head machine screw 23 threaded into the yoke shank 26 formed on the first stub axle 15. Universal yoke 21A is prevented from spinning around the yoke shank 26 by the clamping force exerted by the cup point set screws 22. A first driven wheel W1 is attached to first driven spindle 9 that is pivotally attached to a first driven axle 25A. The first driven axle 25A is subsequently attached to universal yoke 21A using universal cross 24. The first stub axle 15 is fastened to a first friction driven plate 27 using a plurality of socket head machine screws 28 thereby completing the first drive line to the first driven wheel W1. A second friction driven plate 29 is supported on driving journal 32 provided on a second stub axle 30 with its journal 31 fitting inside bearing bore 33 in the first friction driven plate 27, thereby causing friction driven plates 27 and 29 to be in concentric alignment with locking adjusting nut 16, compression spring 38, thrust bearing 37, drive gear 39, and the first stub axle 15. Threaded shaft 34, on the second stub axle 30, engages the internal threads in the adjusting nut 16 shown in a fixed position. A second driven wheel W2 is similarly attached to a second driven axle 25B as the first driven wheel W1 is attached to the first driven axle 25A. Second driven axle is further attached to a second universal yoke 21B in the same manner as the first driven axle 25A is attached to the first universal yoke 21A. Second universal yoke 21B is attached to a second stub axle 30 in the same way universal yoke 21A is attached to the first stub axle 15. Rotation of the second driven wheel W2 in either direction, cw or ccw, causes the adjusting nut 16 to move axially along threaded shaft 34 allowing shoulder 35 on adjusting nut 16 to compress spring 38 against thrust bearing 37 which is seated in bore 40 of the first friction driven plate 27. This compressive force is transferred to friction driven plates 27 and 29 bearing against a plurality of rolling balls 41 encased within the web 42 of the drive gear 39, causing the adjusted torque provided by the rotating drive gear 39 to be transmitted to driven wheels W1 an W2.

Figure 3:
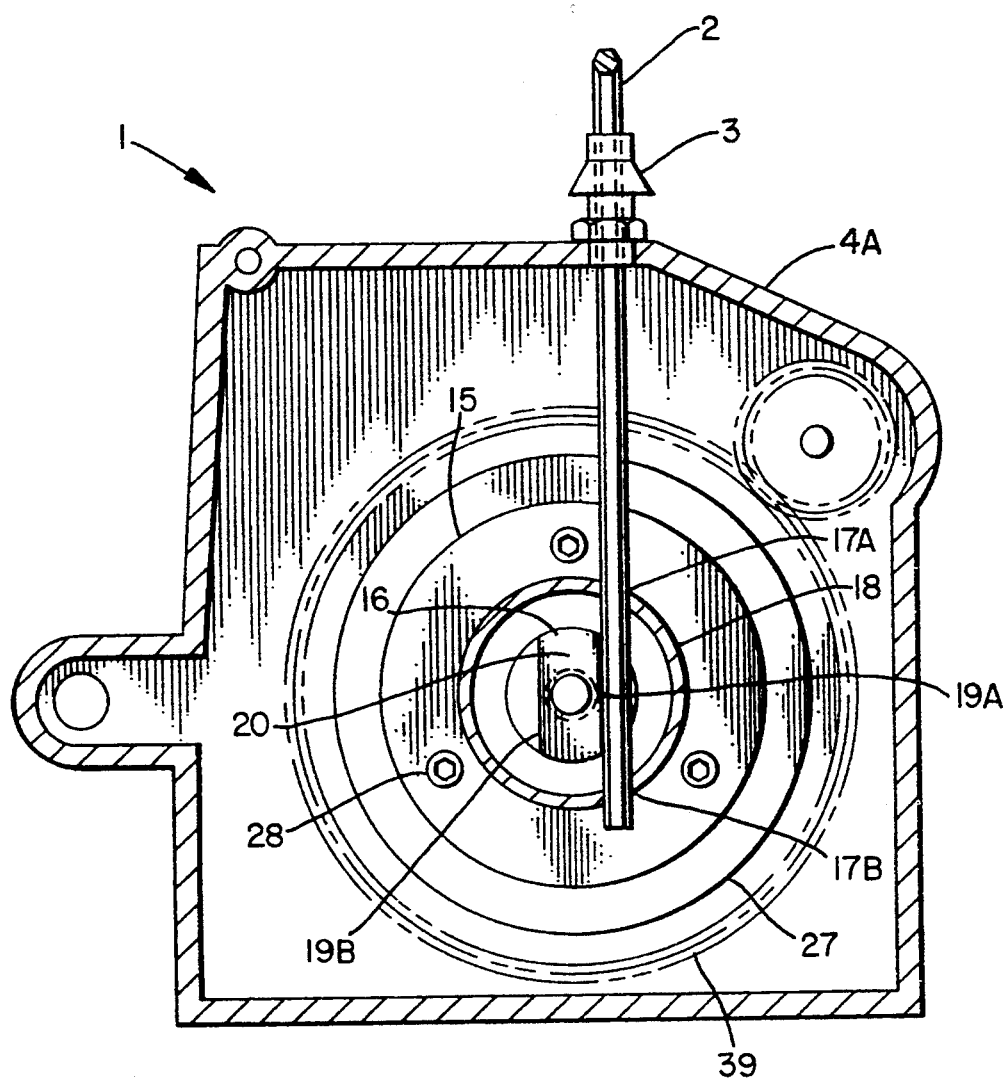
FIG. 3 is a section view taken along line 3—3 of FIG. 2.

The embodiment that provides the means for locking one driven wheel W1 while the second wheel W2 is left free to rotate is shown in FIG. 3. Locking pin 2 is shown passing through the guide adapter 3, transverse holes 17A, 17B, and the shank of locking pin 2 is adjacent either of the flat parallel surfaces of 19A or 19B on the shank 20 of locking adjusting nut 16. Further shown is the first driven stub axle 15 attached to the first friction driven plate 27 with socket head fasteners 28. Since the transverse holes 17A and 17B in the circular housing 18 are an integral feature of the stub axle 15, and receive the shank of locking pin 2, no relative motion can occur between housing 4A, stub axle 15, and locking adjusting nut 16. The first stub axle 15 is thus prevented from rotating because locking pin 2 is held in a fixed position by guide means adapter 3. Locking adjusting nut 16 is also restrained from rotating because locking pin 2 is positioned adjacent transverse surface 19A or 19B by means of the location of transverse holes 17A and 17B. Due to the described emplacements, rotary motion of drive gear 39 cannot be transmitted to the driven wheels W1 and W2 when the locking pin 2 is positioned as shown in FIGS. 2 and 3.

Figure 4:
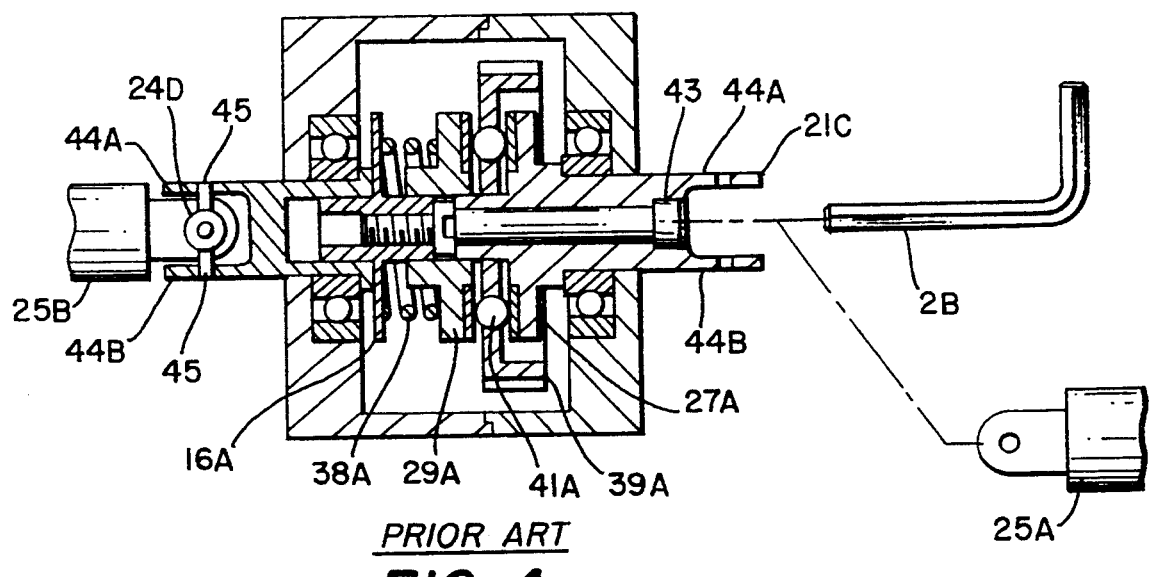
FIG. 4 is a view of one known prior art device.
Figure 5:
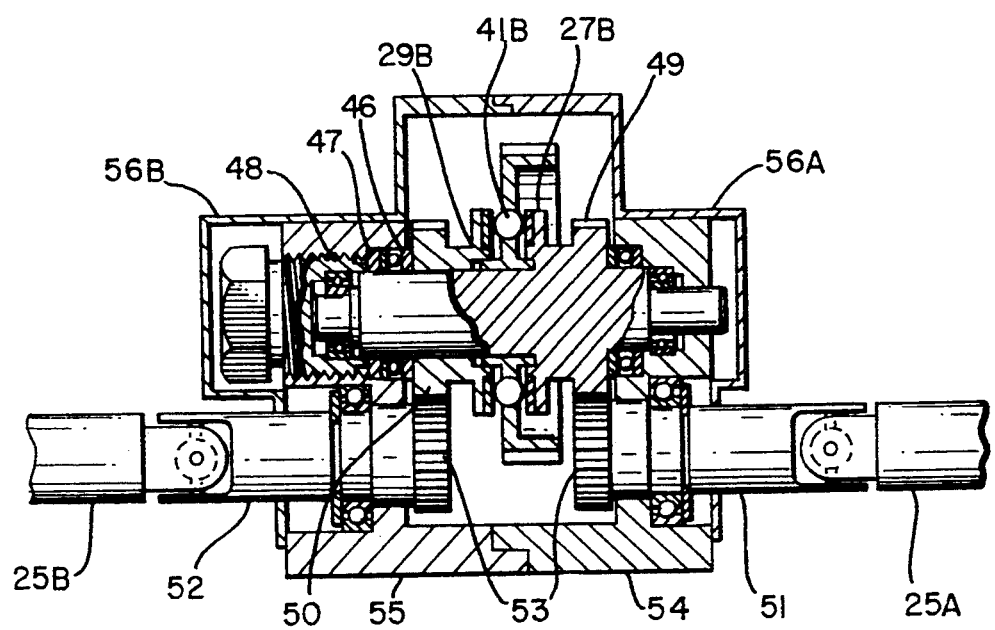
FIG. 5 is a view of a second known prior art device.

FIGS. 4 and 5 illustrate known prior art where a differential mechanism having a purpose similar to the instant invention and requires disassembly of the vehicle's drive line to adjust the tractive torque at the driven wheels, or require removal of its cover to gain access to the adjustment members.

In FIG. 4 a driven line 25A has been removed in order to allow the wrench 2B to be seated inside the head of adjusting screw 43. To accomplish the removal of drive line 25A, the flanges 44A and 44B of universal yoke 21C must be pried over opposite trunnions 45 of universal cross 24D. This is time consuming since prying tools are often screw drivers, pliers, small shafts and the like. A serious thread of breaking one or both flanges 44A or 44B is always present. A broken flange results in further disassembly of the differential to replace the damaged part, thereby increasing the time lost in a racing event, and also increasing the cost of vehicle repair. Adjustment of tractive torque is accomplished by holding the driven axle 25B, inserting the wrench 2B into the recessed socket within the adjusting screw 43. Rotating the screw 43 causing the thread engagement with adjusting nut 16A to increase or decrease, thereby causing adjusting nut 16A to change the compressive force exerted by spring 38A upon a second driving plate 29A resulting in a reduced, or increased compressive force applied to the rolling bearings 41A by driving plates 27A and 29A. Changes of compressive forces upon the rolling bearings 41A causes changes in tractive torque available at the driven wheels. After the adjustment is made, the driven shaft 21C is replaced in the reverse order from its removal, providing another opportunity for damage to the drive line universal yokes.

A conventional dropped drive line differential is shown in FIG. 5. Cowling halves 56A and 56B must be removed from trunnions 54 and 55 in order to gain access to the adjusting nut 48. Drive lines 25A and 25B must be removed before cowling halves 56A and 56B can be removed. With the cowling removed, hold the driven shaft 25A, and rotate adjusting nut 48 thereby causing the compressive force of spring 47 applied to a second driven plate 29 to change. This change of compressive force applied to the second driven plate 29B results in a change in compressive force on the rolling bearings 41B between the first driven plate 27B and a second driven plate 29B. Variation of this compressive force provides for adjustment of the tractive torque at the driven wheels.

In summary, torque adjustments applied to the driven wheels of a model vehicle are made by inserting a locking pin into its driving differential; rotating a driven wheel until the locking pin passes through a first stub axle that is connected to driven wheel, and by one of the flat parallel surfaces of a locking adjusting nut, thereby preventing rotation of the first stub axle and locking adjusting nut. The external threaded end of the second stub axle engages the internal threads of the locking adjusting nut, while the opposite end is attached to a second driven wheel and is free to rotate. The first stub axle drives a laterally sliding friction driven plate, and the second stub axle drives a laterally fixed friction driven plate. These friction driven plates oppositely bear against rolling bearings encased within the web of a primary driving gear, and the torque transmitted to the driven wheels is proportional to the compressive force applied by the friction driven plates to the rolling bearings within the web of the primary driving gear. An outer shoulder of the locking adjusting nut bears against the free end of a compressive spring, while the fixed end of the compression spring bears against the outer race of a thrust bearing supported in the laterally sliding friction driven plate. Rotation of the free turning wheel causes the adjusting nut to travel axially along the threaded end of the second stub axle causing the compressive force exerted by the compression spring upon the friction driven plates to change. This change in compressive force by the compression spring upon the friction driven plates results in a change in torque at the driven wheels of the model vehicle.

It is seen that a useful invention has been provided for use with scale model vehicles that are remotely controlled, and is particularly adaptable to competitive racing vehicles. The invention substantially meets it's objectives set forth herein, providing an improvement that results in economy of vehicle operation not supplied before. The invention is not limited to the described structure, but may be made in many ways within the scope of the appended claims.

The components shown in FIG. 2 may be selectively made of metal, plastic, graphite, ceramic, or other materials within the scope of good engineering practice.

What is claimed:

1. In a power train of a vehicle having a differential with an enclosure, including a primary power drive gear with a web, friction driving members encased in said web, friction driven plates, a stored energy device, a first stub axle, a second stub axle having a threaded end, each said axle associated respectively with a first and second driven wheel, the improved apparatus comprising in combination:

means for adjusting differential torque, without disassembly of the differential including a) a locking pin for preventing the first driven wheel from rotating when said second driven wheel is rotated, b) guide means for directing said locking pin inside said differential enclosure, without disassembly of one of said differential and said enclosure, c) a locking adjusting nut threaded onto said second stub axle,
d) guide means on said locking adjusting nut to receive and guide said locking pin whereby said pin and nut prevent further rotation of said locking nut while permitting said threaded end and said second stub axle to advance or retract in said locking adjusting nut, means including said locking adjusting nut and said stored energy device for transmitting adjusting driving torque to and between said driven plates.

2. An apparatus for adjusting differential torque as in claim 1, wherein said means for transmitting adjusted driving torque to and between said driven plates, comprises a shoulder on said adjusting nut which cooperates with said stored energy device to transmit said torque to said driven plates.

3. Means for adjusting differential torque without disassembly of the differential enclosure, including as in claim 1, wherein the locking pin includes an L-shaped hexagonal locking pin, wherein said pin includes an insertion limiting member relative to the differential enclosure.

4. An apparatus as in claim 3, which includes a guide means adapter for receiving and guiding said locking pin, and wherein said adapter is located at the top of said enclosure.

* * * * *